United States Patent
Eilers et al.

(10) Patent No.: US 7,742,401 B2
(45) Date of Patent: Jun. 22, 2010

(54) NETWORK HAVING SWITCHOVER WITH NO DATA LOSS

(75) Inventors: Fritz R. Eilers, Portsmouth, NH (US); Mark R. Parquette, East Kingston, NH (US)

(73) Assignee: NetApp, Inc., Sunnyvale, CA (US)

( * ) Notice: Subject to any disclaimer, the term of this patent is extended or adjusted under 35 U.S.C. 154(b) by 1723 days.

(21) Appl. No.: 10/638,817

(22) Filed: Aug. 11, 2003

(65) Prior Publication Data

US 2005/0036485 A1 Feb. 17, 2005

(51) Int. Cl.
*G06F 9/44* (2006.01)
*H04L 12/56* (2006.01)

(52) U.S. Cl. .............. 370/219; 370/216; 370/389; 717/168; 717/174

(58) Field of Classification Search ............ 370/389
See application file for complete search history.

(56) References Cited

U.S. PATENT DOCUMENTS

| | | | | |
|---|---|---|---|---|
| 5,825,881 A | * | 10/1998 | Colvin, Sr. | 705/78 |
| 5,953,314 A | * | 9/1999 | Ganmukhi et al. | 370/220 |
| 6,169,726 B1 | * | 1/2001 | Dempsey et al. | 370/219 |
| 6,226,261 B1 | * | 5/2001 | Hurtta et al. | 370/219 |
| 6,389,019 B1 | * | 5/2002 | Fan et al. | 370/395.42 |
| 6,675,258 B1 | * | 1/2004 | Bramhall et al. | 711/114 |
| 7,185,061 B1 | * | 2/2007 | Gopal et al. | 709/207 |
| 7,430,735 B1 | * | 9/2008 | Balakrishnan et al. | 717/173 |
| 2003/0005426 A1 | * | 1/2003 | Scholtens et al. | 717/169 |
| 2003/0055583 A1 | * | 3/2003 | Lay et al. | 702/57 |
| 2003/0093688 A1 | * | 5/2003 | Helgesen et al. | 713/200 |
| 2003/0095648 A1 | * | 5/2003 | Kaib et al. | 379/106.02 |
| 2003/0117949 A1 | * | 6/2003 | Moller et al. | 370/219 |
| 2003/0135642 A1 | | 7/2003 | Benedetto et al. | |
| 2003/0137941 A1 | | 7/2003 | Kaushik et al. | |
| 2003/0147398 A9 | * | 8/2003 | Matsuoka et al. | 370/395.4 |
| 2003/0158966 A1 | * | 8/2003 | Sato | 709/242 |
| 2003/0189935 A1 | | 10/2003 | Warden et al. | |
| 2004/0081184 A1 | * | 4/2004 | Magill et al. | 370/413 |
| 2004/0261072 A1 | * | 12/2004 | Herle | 717/171 |
| 2005/0286551 A1 | * | 12/2005 | Berman | 370/465 |

OTHER PUBLICATIONS

Sandial Systems, Inc., Requistion for Purchase No. 312039, Aug. 12, 2002, p. 1.

* cited by examiner

*Primary Examiner*—Rafael Pérez-Gutiérrez
*Assistant Examiner*—German Viana Di Prisco
(74) *Attorney, Agent, or Firm*—Perkins Coie LLP

(57) ABSTRACT

A data switchover from a first switching module to a second switching module has no data loss. A graceful code upgrade in a Fibre Channel network, for example, with no data loss can be achieved.

20 Claims, 9 Drawing Sheets

NETWORK HAVING SWITCHOVER WITH NO DATA LOSS

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to networks and, more particularly, to networks having data switchover capability.

BACKGROUND OF THE INVENTION

As is known in the art, there are a wide variety of protocols for controlling the flow of data in a network. For example, the Fibre Channel communications protocol is designed to optimize specific types of data traffic including block level data transfers. This protocol is designed to have high performance and high scalability: current standards propose 10,000 Mb/s speeds. A single Fibre Channel fabric can support from about 2 to over 16 million concurrent ports using a 24-bit address identifier. The Fibre Channel protocol supports a heterogeneous system allowing different peripherals using different cabling types to communicate at high speed. Exemplary device types include supercomputers, mainframes, workstations, desktop PCs, other Fibre Channel switches, and tape drives.

Network Switch Topology or Fabric is used to form a mesh of connections. Each attached device is able to communicate with other attached devices. In a Fibre Channel network, a communication channel is established between two nodes where the channel's primary task is to transport data from one point to another. The Fibre Channel switch provides flexible circuit/packet switched topology by establishing multiple simultaneous point-to-point connections. A Fibre Channel switch centralizes data flow in a Storage Area Network (SAN). This centralization allows for simplified Quality of Service (QoS) architectures. Management of the SAN is simplified as it is reduced to the set of devices forming the backbone of the fabric.

In known approaches, the redundant elements in a high availability environment do not operate in such as way as to eliminate frame loss. While the disruption is generally specified in terms of milliseconds, data loss for a high performance device can be extreme. For example, a network switch containing 288 2.5 Gb/s gigabit ports running line rate will lose approximately 72 Megabytes each millisecond during a switchover event.

It would, therefore, be desirable to overcome the aforesaid and other disadvantages.

SUMMARY OF THE INVENTION

The present invention provides a switchover from a first (primary) switching module to a second (secondary) switching module with no data loss. With this arrangement, a graceful code upgrade can be achieved without losing data. While the invention is primarily shown and described in conjunction with a Fibre Channel network, it is understood that the invention is applicable to a range of network protocols and network types.

In one aspect of the invention, a method of data switchover in a network switch includes stopping control packets transmission from an active scheduler of the switch, disabling active fabric control signals from the active scheduler, and enabling active fabric control signals from a standby scheduler of the switch. The method further includes waiting a period of time for transmitting data to exit the switch, enabling control packet transmission from the standby scheduler for making the standby scheduler the new active scheduler and making the standby switch fabric the active switch fabric with no data loss.

BRIEF DESCRIPTION OF THE DRAWINGS

The invention will be more fully understood from the following detailed description taken in conjunction with the accompanying drawings, in which.

DETAILED DESCRIPTION OF THE INVENTION

The present invention provides a non-disruptive, data switchover method and apparatus in a high-availability switching environment that is applicable to a wide range of protocols. While the invention is primarily shown and described in conjunction with a High Availability Fibre Channel implementation, it is understood the invention is equally applicable to various protocols and networks. In one particular embodiment, a Fibre Channel switch contains one active (primary) switching element, one redundant (secondary) switching element, and two or more Fibre Channel ports. The failure of the active switching element results in a switchover transition to the redundant switching element with no data loss.

Figure 1:
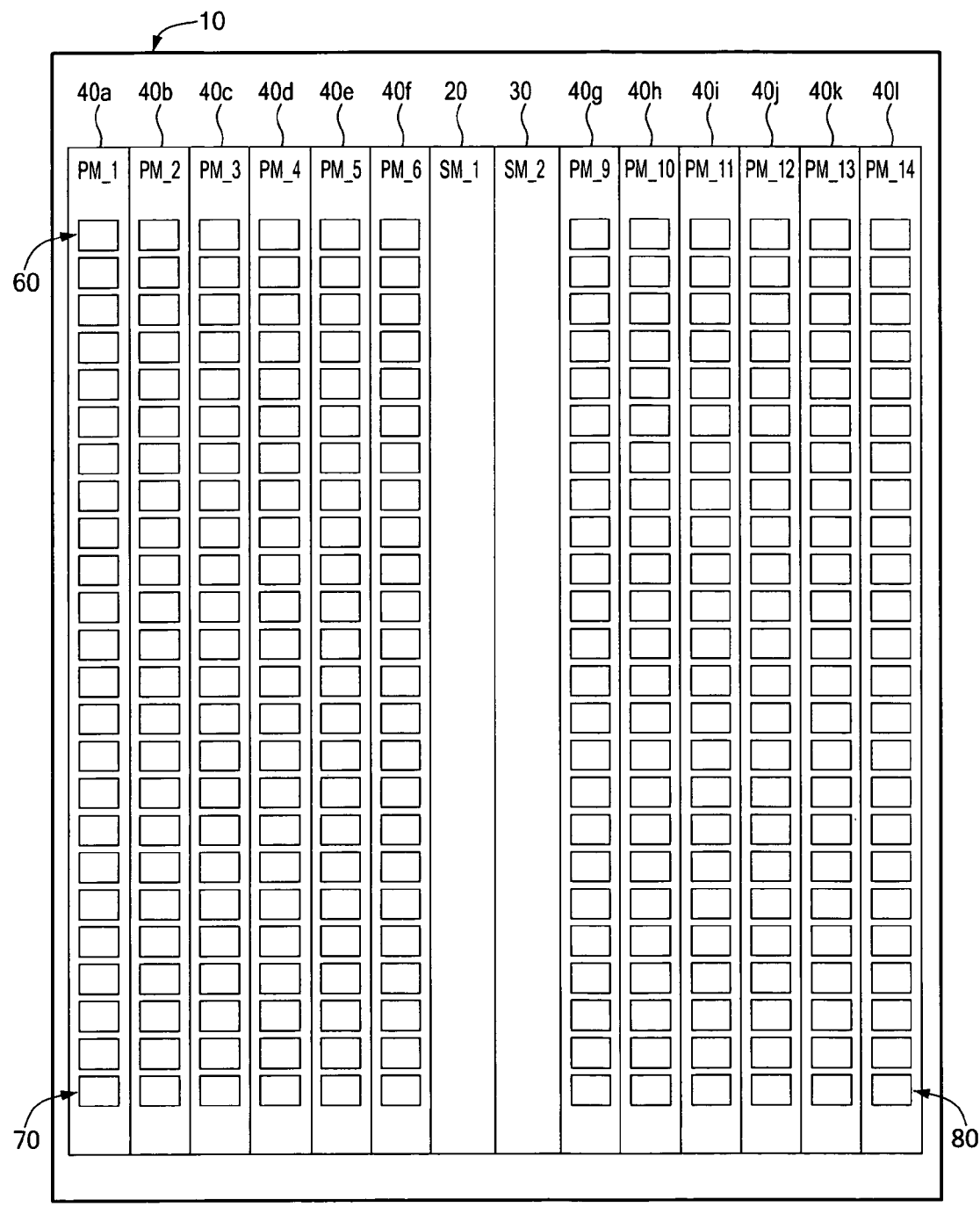
FIG. 1 is a front view of an exemplary switch having 288 ports containing two switching modules and twelve port interface modules each containing 24 ports that can form a part of the present invention.

FIG. 1 shows an exemplary 288-port Fibre Channel chassis switch 10 having data switchover with no data loss in accordance with the present invention. The switch 10 includes first and second centralized Switching Modules (SM_1, SM_2) 20, 30 and twelve (first, second, third, fourth, fifth, sixth, ninth, tenth, eleventh, and twelfth) Port Modules (PM_1-6 and PM_9-14) 40a-l, each having 24 ports. In this particular embodiment, the first port 60 is located at the upper left hand corner of the switch, i.e., at the first port module 40a as shown, the twenty-fourth port 70 is located at lower left hand corner, i.e., at the last port of the first port module 40a, and the two hundred eighty-eighth port 80 is located at the lower right hand corner, i.e., the last port of the twelfth port module 401. The switch 10 can provide lossless switchover in accordance with the present invention, as described more fully below.

Figure 2:
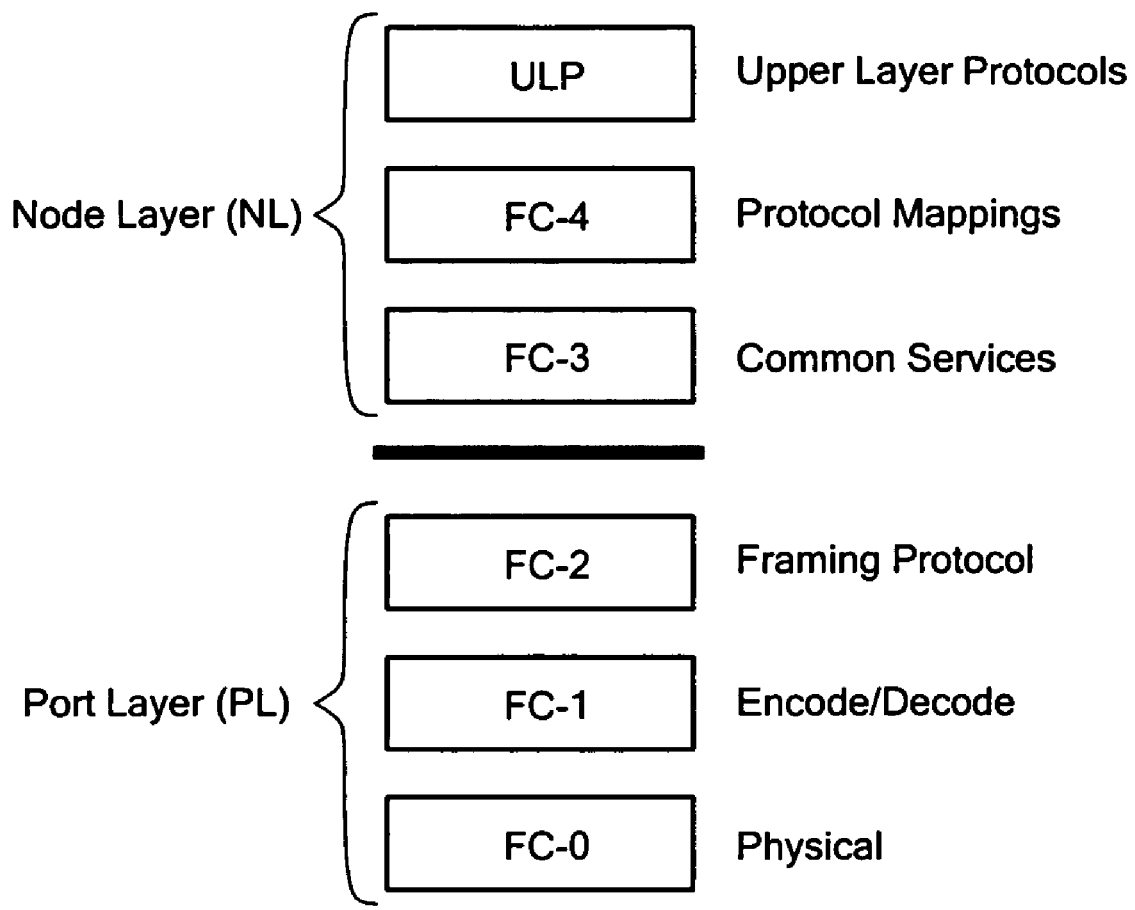
FIG. 2 is a block diagram showing node layer and port layer protocols for the Fibre Channel Protocol that can form a part of the present invention.

FIG. 2 shows layers of the Fibre Channel protocol that can form a part of the present invention. The port layer PL is made up from three different sub-layers: the physical layer FC-0, the Encode/Decode layer FC-1, and the Framing Protocol layer FC-2. The node layer NL is made up from three different sub-layers: the common services layer FC-3, the protocol mappings layer FC-4, and the Upper Layer Protocols layer ULP. The port layer PL, and more particularly, the Framing Protocol layer FC-2, contains Fibre Channel link-level flow control capabilities.

Fibre Channel (FC) has been standardized by the American National Standards Institute (ANSI). FC is a serial data transfer architecture that has been widely adopted in storage area networks (SANS) due to the efficiency and reliability with which it transports blocks of data suited to storage environments. FC offers multiple classes of service as set forth below.

Class 1—connection-oriented, dedicated path

Class 2—acknowledged connectionless

Class 3—unacknowledged connectionless

Class 4—connection-oriented, fractional bandwidth, requiring hardware modifications.

A "call" refers to a connection established from one node in a network to another node in a network. Fibre Channel Class 1 service dedicates an entire path to one call in one direction. While this ensures that the call receives all of the resources available, it can be very inefficient not to share some of the bandwidth on a path with other calls.

Class 4 service is a more efficient alternative to Class 1, in that it enables dedicated fractional bandwidth service. Calls are guaranteed a fixed amount of bandwidth on each leg of the communication path from source to destination, and this bandwidth can be a fraction of, rather than the entire bandwidth, of each segment. However, Class 4 requires changes to both the switch/router and host bus adapter (HBA) hardware.

Class 3 service is the simplest: unacknowledged connectionless service. A transmitter transmits data whenever it wishes, and without any feedback from the network or the receiver indicating the success of the transmission. Most operational FC networks are so highly reliable that Class 3 service is adequate, although overprovisioning is standard practice, in order to increase the probability that applications will receive the bandwidth they need.

Class 2 service is similar to Class 3 in being connectionless, but Class 2 is acknowledged. That is, the recipient sends messages back to the transmitter indicating the success of the receipt of data frames so as to improve reliability.

As is well known to one of ordinary skill in the art, the Framing Protocol FC-2 layer manages data flow such that no collisions or data loss occur. The Fibre Channel Buffer-to-Buffer credit-based flow control pertains to the generation of Fibre Channel Class-2 and Class-3 Receive Ready (R_RDY) frames and Fibre Channel Class-4 Virtual Channel Ready (VC_RDY) frames. Fibre Channel devices negotiate for a fixed number of Buffer-to-Buffer credits. Each credit transmitted to a device by a switch allows the device attached to the Fibre Channel switch to transmit a frame. The above Fibre Channel flow control message exchange for the various classes is well known to one of ordinary skill in the art.

The implementation may be ported to other protocols that provide some level of flow control for data traffic. For example, in an Ethernet implementation, pause frames could be transmitted from the switch to the attached node that would halt data at the ingress port of the switch. Frames in transit would be allowed to exit the switch. The switchover transition would occur after the maximum transit time had expired. This will guarantee no data frames within the switch fabric thereby providing a no data-loss switchover.

In an alternative embodiment, an ATM switch could take advantage of RM cells. Feedback data could be inserted in to RM cells as they pass in either the forward or backward direction. The feedback data could be utilized by the source to stop transmitting until the switchover had completed at which time data flow would be allowed to continue.

In a high availability Fibre Channel switching environment, a set of standby components is available to service the SAN in the event of a failure condition of some or all of the primary components. The set of standby components provides redundancy for the primary set of components. The primary components "mirror" data to the standby components so that the standby components have a real-time view of the SAN. In the event of a failure condition, a switchover to the standby components can be achieved without data loss and with minimal data traffic disruption.

Figure 3:
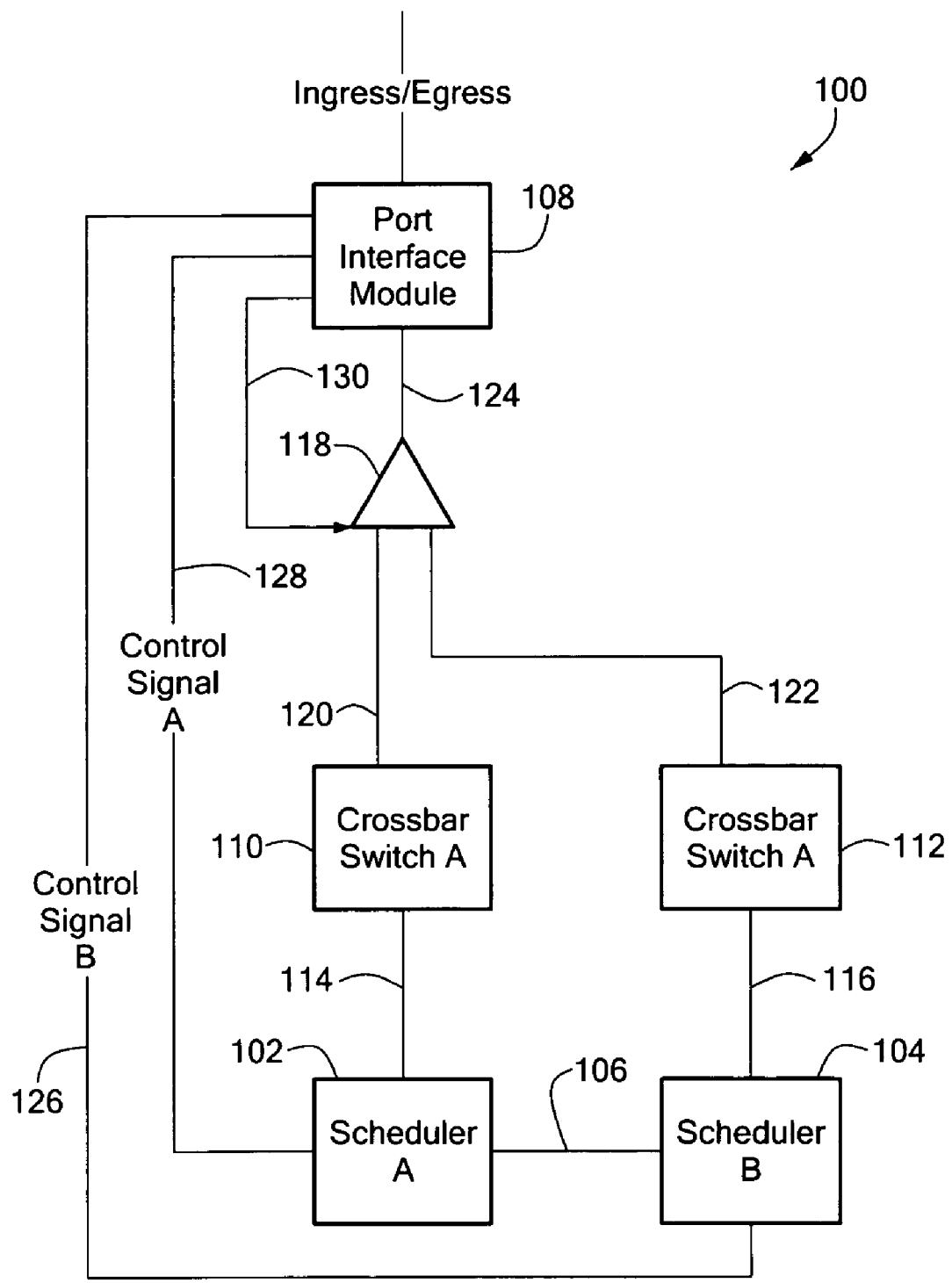
FIG. 3 is a block diagram of a single port scheduler implementation in accordance with the present invention.

FIG. 3 shows an exemplary no data-loss switchover system 100 in accordance with the present invention. Control information flows between first and second scheduler objects 102, 104 over a communication path 106. This control information is used to keep the scheduler objects 102, 104 up to date with respect to current switched virtual circuits. The first and second scheduler objects 102, 104 transmit control data to the attached port interface module 108 through first and second switch fabric objects 110, 112 using respective communication paths 114, 116. The first and second switch fabric objects 110, 112 send data received from the first and second scheduler objects 102, 104 to a multiplexer/switch 118 via communication paths 120, 122.

In one embodiment, the multiplexer/switch 118 allows only one communication path from the active (first or second) scheduler 102, 104 through communication path 124 to the port interface module 108. The multiplexer/switch object 118 is controlled by signals generated by the active (first or second) scheduler 102, 104 via control signal A transmitted over a communication path 126 or control signal B transmitted over communication path 128, which is attached to the port interface module 108. The port interface module 108 uses the control signals A, B, to determine and set the proper state of the multiplexer/switch 118 and to transmit proper state information across communication path 130.

In one embodiment, the control signals A and B are binary control signals. Logic contained within the Port Interface Module 108 derives the output binary signal 124 from the input of the control signals A, B. If scheduler A 102 is active, control signal A is set to a logical "1". In this scenario, Scheduler B 104 is in-active, and control signal B is set to 0. Logic in the Port Interface Module 108 ignores the invalid states in which both control signal inputs are 1 or both inputs are 0.

Figure 4:
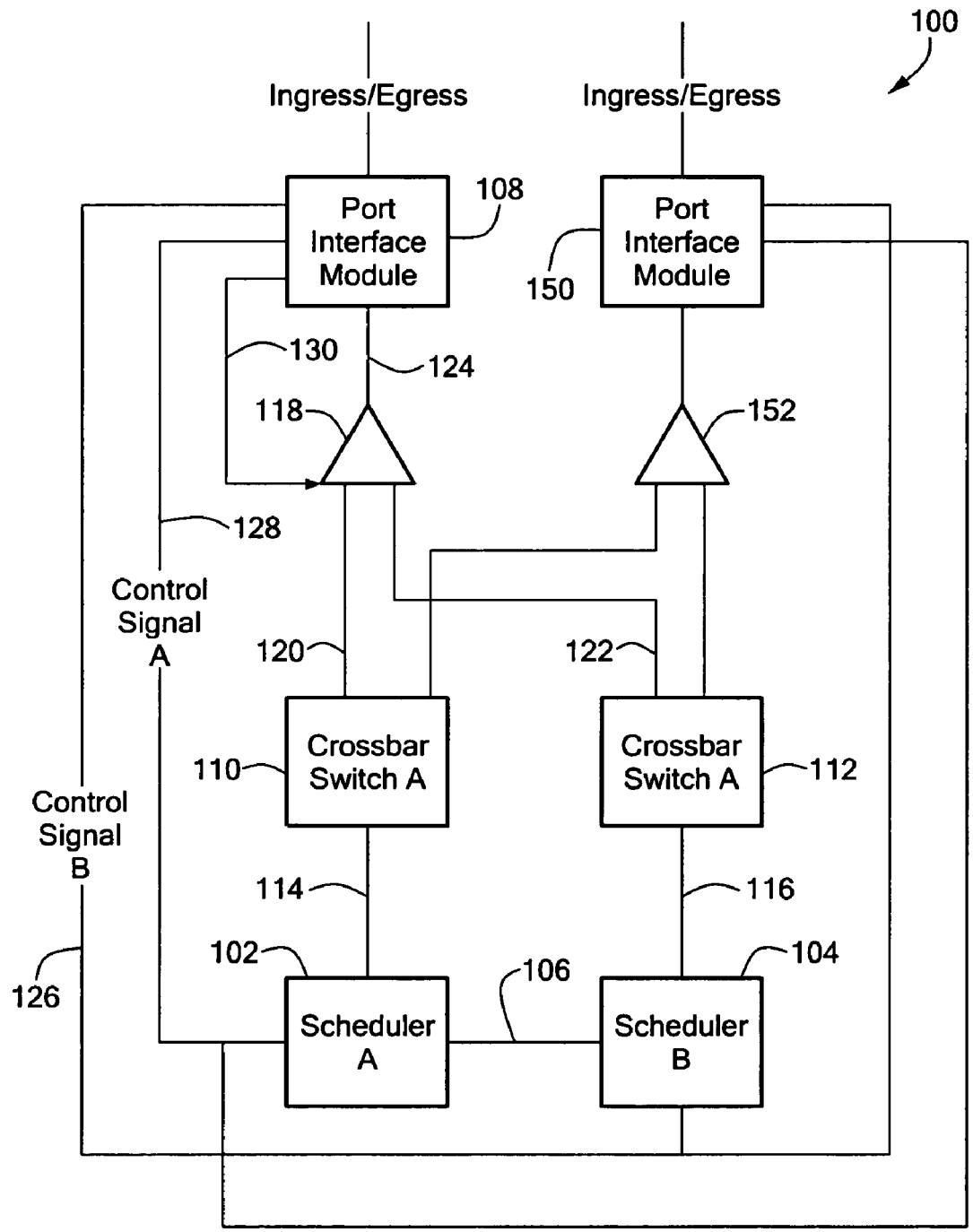
FIG. 4 is a block diagram of a dual port scheduler in accordance with the present invention.

As shown in FIG. 4, it is understood that the invention is readily extendible to further ports. In addition to the components of the system shown in FIG. 3, in which like reference designations indicate like elements, the system of FIG. 4 further includes a second port interface module 150 and second multiplexer/switch 152 along with accompanying communication paths.

While relying on the Fibre Channel Receiver Ready frames for flow control, it is understood that this simplified version requires an additional modification at the port module interface. Logic inside the port interface module performs a switchover after stopping receive ready frames from being returned to the sender. This logic waits for a period of time that represents transit time of the switch for the maximum frame size plus the time that it takes to synchronize the data interface across the multiplexer. This guarantees that no data is in the switch at the switchover time, thus guaranteeing no data loss with minimal cessation of data flow across the switch.

It is understood that the invention does not require a time-based scheduling component, but does requires a mechanism to halt new frames from being taken in at the ingress port while allowing those frames in transit the time required to exit the switch at the egress port. The flow control mechanisms present in Fibre Channel, Ethernet, and ATM protocols, for example, provide the ability of halting data flow at the ingress port of the design.

Figure 5:
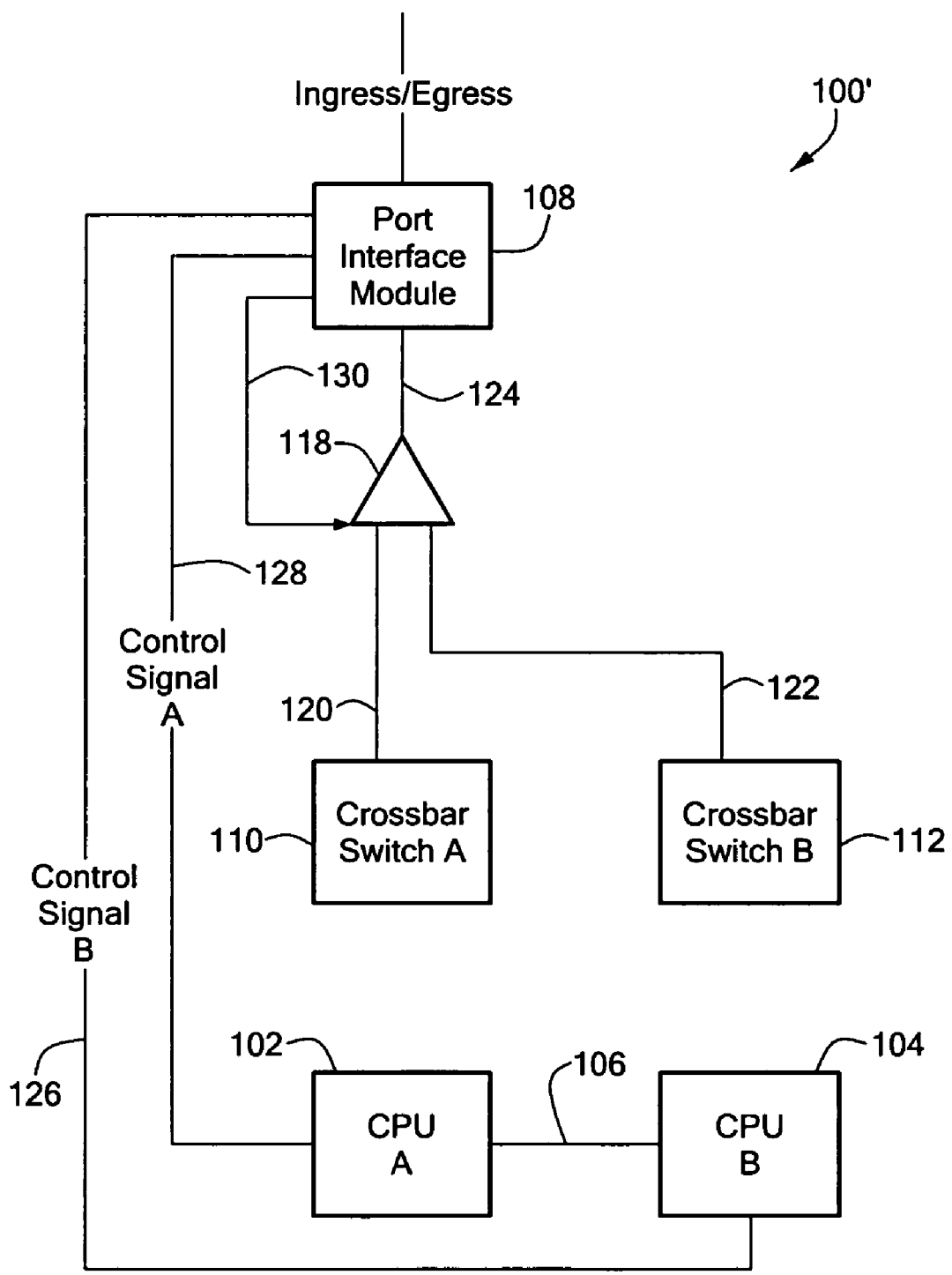
FIG. 5 is a block diagram of a single port scheduler in accordance with the present invention.

FIG. 5 shows a non time-based implementation 100' in which only a single port interface module is depicted. It is understood that an operational embodiment will include a plurality of port interface modules. FIG. 5 illustrates the connections between objects forming the basis for a no data loss switchover system in a system without the scheduler components identified in FIG. 3, where like reference designation indicate like elements. Control signal A and Control signal B 126, 128 are used to control the state of the multiplexer object 118 through the port interface module 108. The port interface module 108 receives the input signal(s) and makes a decision on the state of the multiplexer object 118.

The present invention can provide, for example, to perform a "graceful" software application upgrade between two switching modules. The application or image installation procedure includes downloading first (primary) and second (secondary) switching modules with code, installing the software and firmware on each module, and restarting the system in such a way as to minimize network disruptions, e.g., with zero down time and no packet loss.

Figure 6:
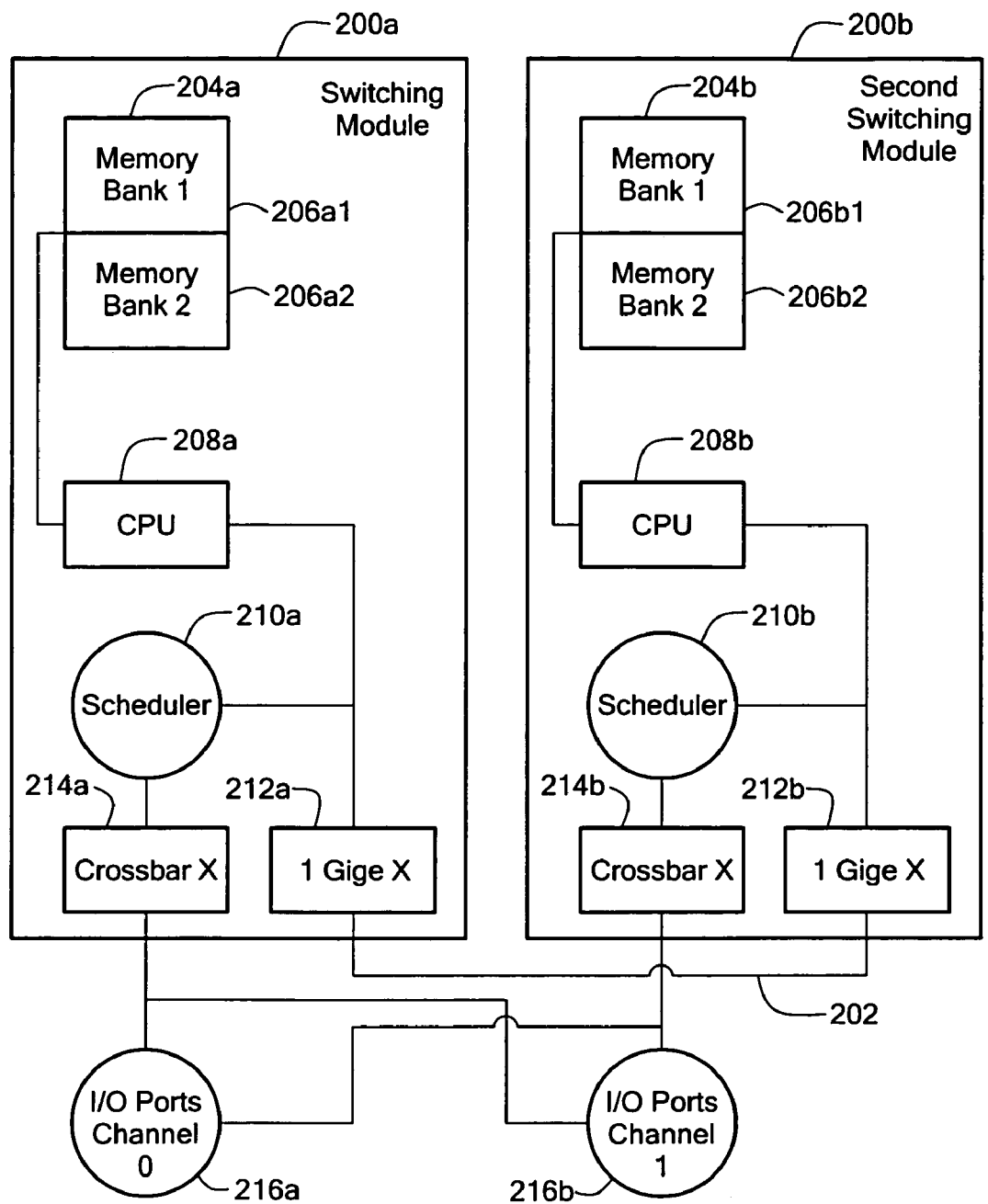
FIG. 6 is a block diagram of a switching module in accordance with the present invention.

FIG. 6 shows first and second switching modules 200a, 200b providing a graceful (lossless) code upgrade in accordance with the present invention. The switching modules 200a, 200b are connected to each other on a gigabit Ethernet communication channel 202. The first switching module 200a includes a dual memory 204a having first and second memory banks 206a1, 206a2 and the second switching module 200b similarly includes a dual memory 204b having first and second memory banks 206b1, 206b2. As described more fully below, the dual memories 204a, 204b with first and second memory banks enable a code upgrade while the existing system image is running.

The first switching module 200a further includes a CPU 208a coupled to the memory 204 and to a scheduler 210a and a channel interface 212a. The scheduler 210a is coupled a switch fabric 214a, which is connected to I/O port channel 0 216a. The channel interfaces 212a,b of the first and second switching modules are connected.

The second switching module 200b includes components corresponding to those in the first switching module as shown. I/O port channel 0 216a is coupled to I/O port channel 1 216b, the first switching module switch fabric 214a, and the second switching module switch fabric 214b. Similarly, I/O port channel 1 is coupled to the switch fabrics 214a,b of the first and second switching modules and to I/O port channel 0.

It is understood that FIG. 6. represents one hardware implementation of the present invention. It is further understood that FIG. 6 elements, 208a, 210a, 212a, and 214a correspond to elements 110, and 102 of FIG. 4. Also, FIG. 6 element 216a maps to FIG. 4 elements 108 and 118.

Figure 7:
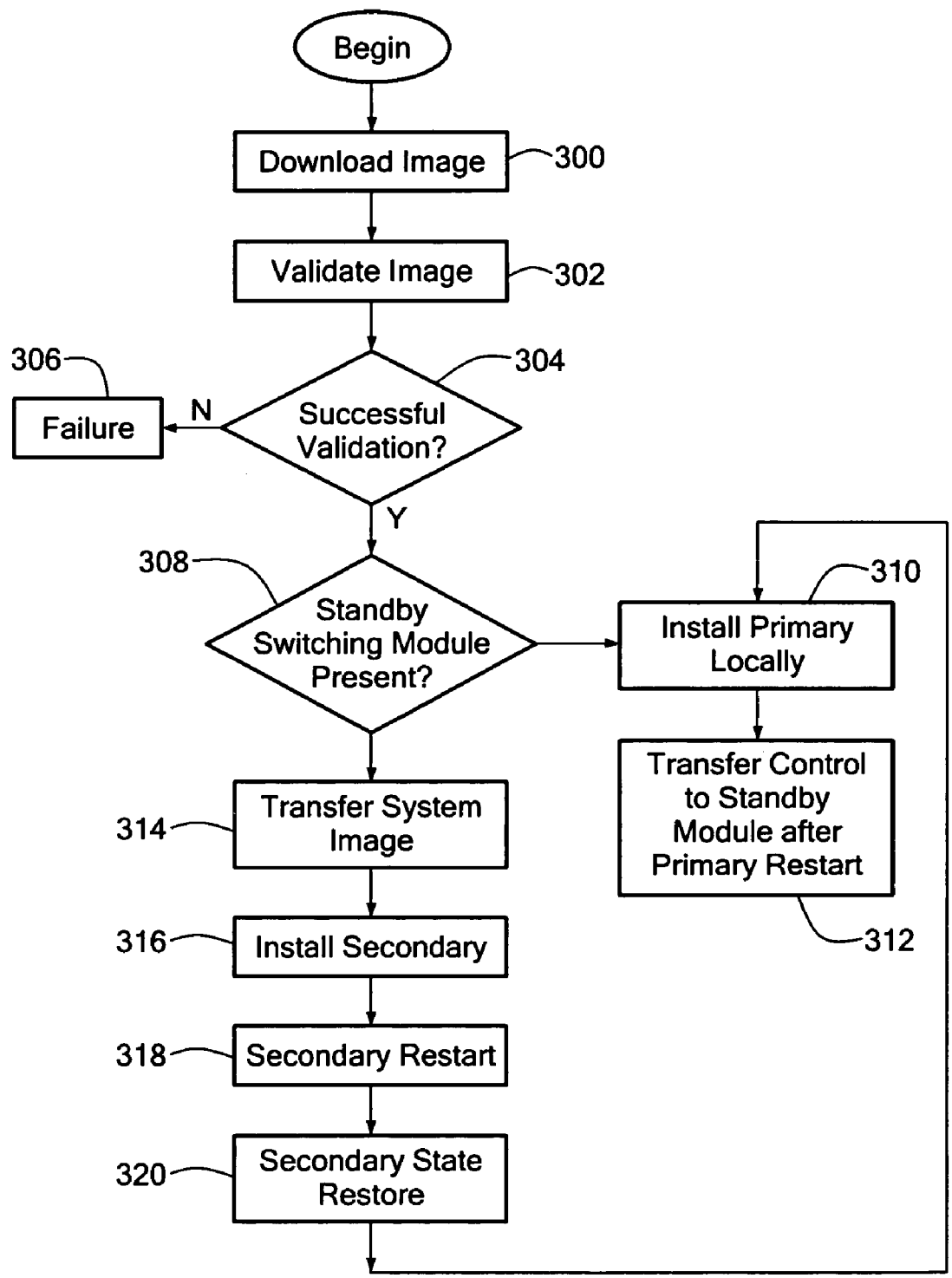
FIG. 7 is a flow diagram showing an exemplary sequence of steps for implementing lossless switchover in accordance with the present invention.

FIG. 7 illustrates an exemplary flow diagram for a graceful code upgrade implementation in accordance with the present invention. In step 300, the upgrade process begins by transferring the system image file from the network. Once this file has been downloaded to the active switching module, the image is validated, such as by cyclic redundancy check (CRC), and contents applicability in step 302. That is, the system image contains information that is validated against the hardware type and hardware revision. If the system image is not intended for the hardware installing the image, the installation procedure will not continue. In step 304, it is determined whether the image validation was successful. If not, this failure is handled in step 306. For a successful validation, in step 308 the active switching module verifies the presence of a standby switching module. If there is no standby switching module available, the active switching module installs the system image locally at step 310 and performs a primary restart resulting in a transfer of system control to the standby module in step 312.

If there is a standby switching module the active switching module as determined in step 308, the system image is transferred to the standby switching module. Once the image has been successfully downloaded and has been validated by the standby switching module, the active switching module installs the system image on the standby switching module in step 316. At the completion of the installation, the standby switching module restarts at step 318 and comes up as the standby switching module running the newly installed system image in step 320.

Once the standby switching module returns to its standby state, the active switching module installs the new system image in step 310 and the active switching module restarts resulting in a transfer of control to the standby switching module in step 312.

System control may be transferred by request when the system is operating normally or may be transferred when the system is determined to be faulting. Control is transferred by user request or by the image installation procedures described herein. If the system is determined to be faulting, likely a diagnostic failure of hardware or software, the active module may request that the standby module become the active module. In the event that there is a failure of the active system monitor, the core system code that monitors system behavior, the standby may assume control of the system based on a hardware event, control signals between the two switch modules 106, or by a failure of periodic peer health checks.

Figure 8:
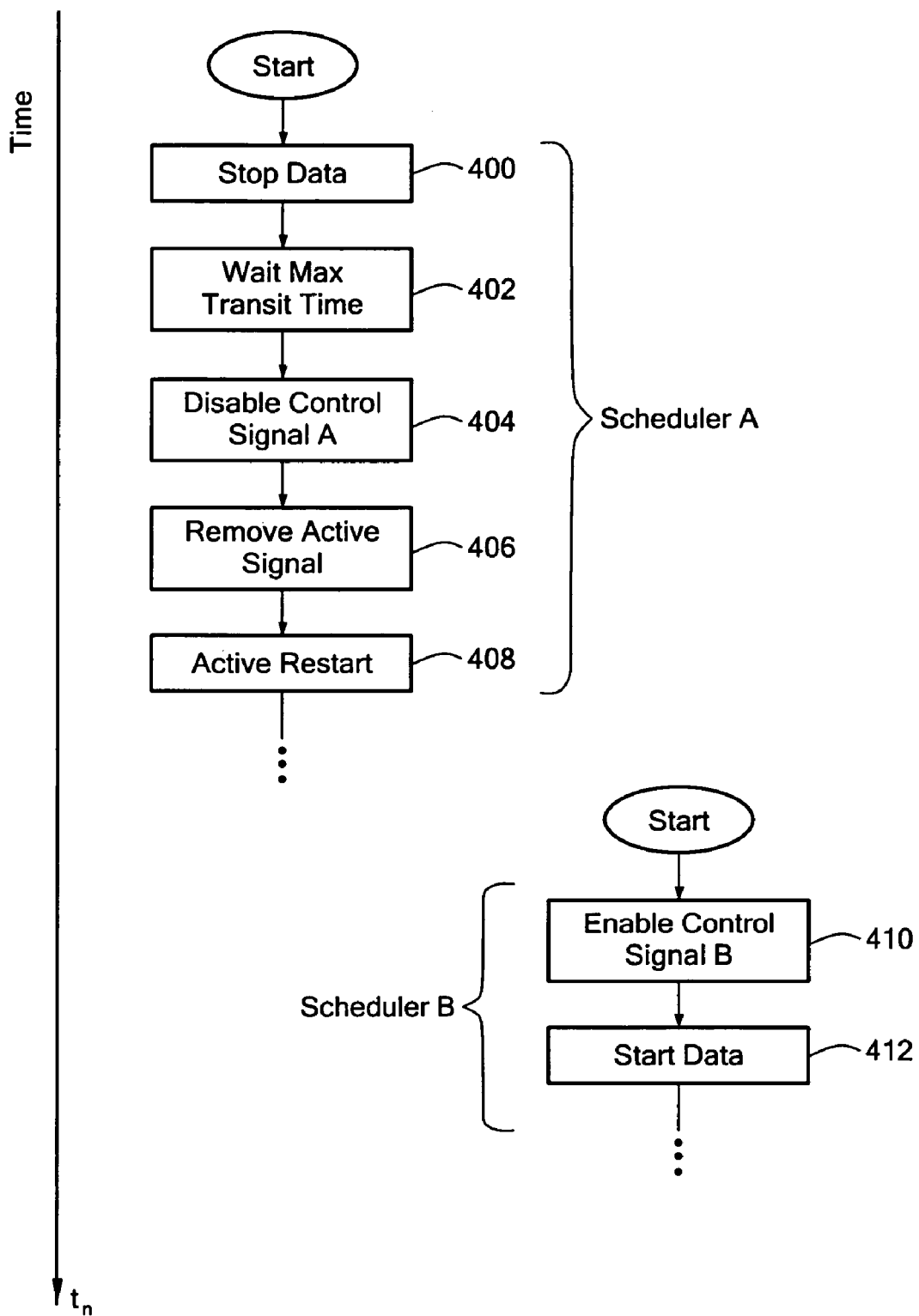
FIG. 8 is a flow diagram showing an exemplary sequence of steps forming an operational transition from an active module to a standby module.

FIG. 8 shows an exemplary sequence of steps over time showing transitions between an active schedule and a standby scheduler in accordance with the present invention. In step 400, the active scheduler stops the data flow across the switch and wait a predetermined, calculated, or signaled period in step 402. In step 404, the active schedule disables control signal A (see FIGS. 3, 4, 5). At this point data ceases to be received at the ingress ports and has exited the switch through the destination egress ports. At step 406, the active module disables itself from the viewpoint of the standby module (the standby now recognizes that the active module is no longer active) by removing the active signal 106 (FIG. 4) between the active and standby schedulers. In step 408, the active schedule restarts.

The standby module observes the de-activation of the signal 106 and in step 410 enables control signal B. In step 412, data then continues to flow across the system under via the now activated standby module.

Figure 9:
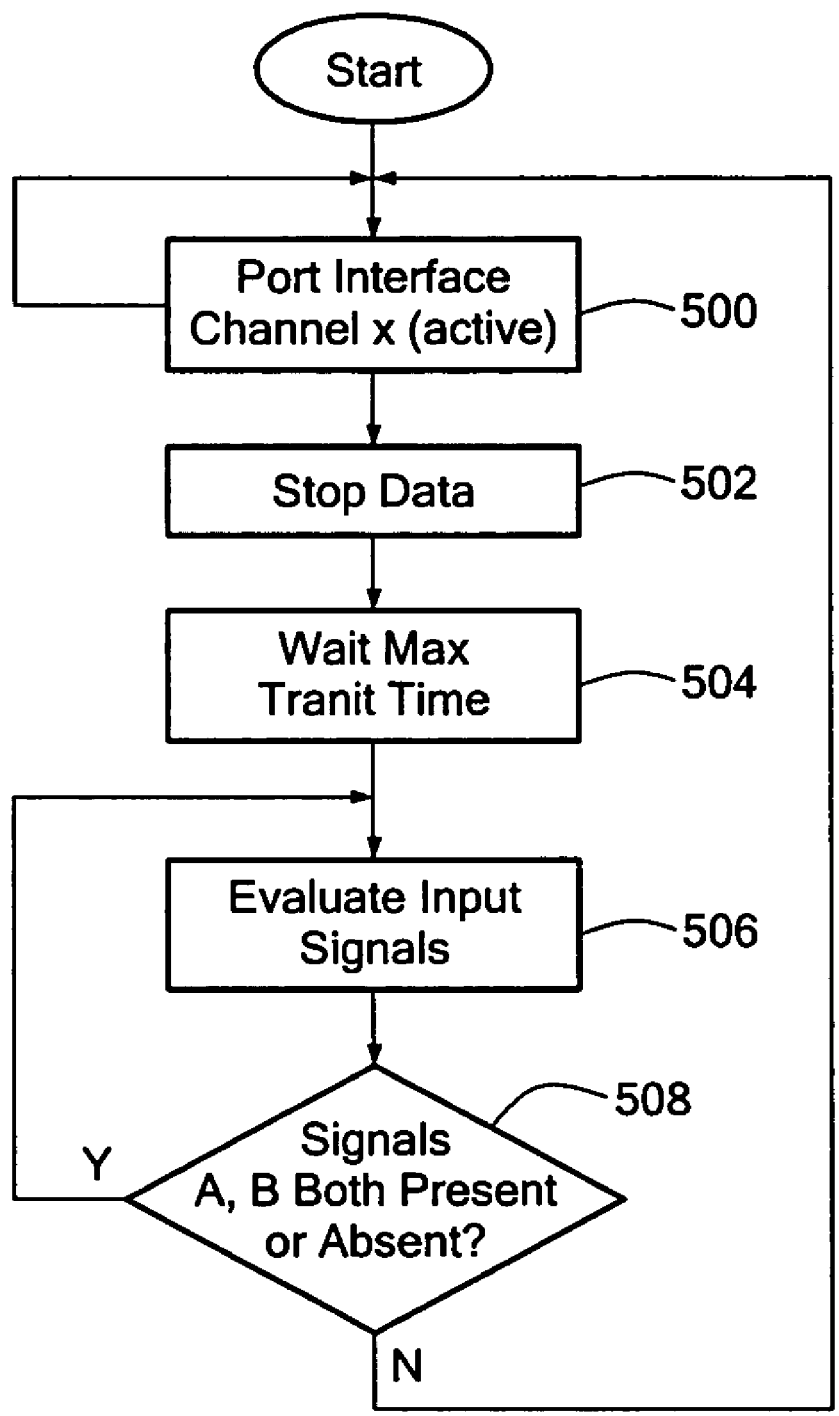
FIG. 9 is a flow diagram showing an exemplary sequence of steps for controlling the transition from one of centralized scheduler agents in accordance with the present invention.

FIG. 9 shows an exemplary sequence of steps depicting control of a transition from one of the centralized agents, e.g., Scheduler A or B (FIG. 3, 4, 5), to a port interface module model in which the transition intelligence has been relocated at the edge of the device. The port module remains in a steady state in step 500 as long as the input control signals A, B remain constant. If there is a change in the control signals, control signal A being disabled for example, the port interface module transitions by stopping data flow in step 502 and allowing the data to transit the system by waiting for a period of time, such as the maximum data transit time, in step 504. In step 506, the input control signals A, B are evaluated. In step 506, it is determined whether both control signals A, B are present or absent. If so, in step 508, no transition can occur and the control signals are re-evaluated. If only one of the control signals A, B is active, the port interface channel X becomes active in step 500.

The present invention can provide a lossless switchover in a network. In the context of a scheduled crossbar architecture first and second Fibre Channel switch fabric controller schedulers are run and updated in parallel. The active scheduler effects internal switch flow control by transmitting control packets to the port interface modules which in turn allows each port interface module to send Fibre Channel Receiver Ready (R_RDY) frames to the attached device. In this manner, the cessation of control packets from the scheduler will stop data being received by the port interface module. A switchover between Fibre Channel fabrics, with no data flow across the switch, results in no data loss across the switch.

In one embodiment, switchover speed is dependent on the underlying hardware clock synchronization speed between the port interface module and the crossbar switch multiplied by the number of ports on the crossbar switch. In one particular demonstrated implementation, cessation of data flow across a fully loaded 288 port switch is as low as eight milliseconds.

As described above, the present invention provides a switchover accomplished without data loss and triggered by internal scheduler events or by an external management entity. In general, control packet transmission from the active scheduler is stopped and active fabric control signals from the active scheduler are disabled. Active fabric control signals from the standby scheduler are then enabled. After waiting a finite period of time for clock synchronization multiplied by the number of ports, for example, control packets from the standby scheduler are enabled, thus making the standby scheduler the new active scheduler and making the standby switch fabric the active switch fabric.

It is understood that products designed for high speed, heavily utilized environments, reliability is a significant factor. A system that is designed with redundant components that produces a no data-loss switchover during a failure event provides the highest levels of availability. The present invention defines a system in which switchover speeds are fast, minimizing the transition interval to the redundant components. More particularly, the present invention defines a mechanism that will produce a system in which no data loss will occur during this switchover period.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A network switching device, comprising:
   a first CPU coupled to a first memory, the first memory containing a first system software image;
   a second CPU coupled to a second memory, the second memory containing a copy of the first system software image;
   a first scheduler generating a first control signal;
   a second scheduler coupled to the first scheduler, the second scheduler generating a second control signal;
   a first switching fabric coupled to the first scheduler;
   a second switching fabric coupled to the second scheduler;
   a multiplexer receiving a first input signal from the first switching fabric and a second input from the second switching fabric, and generating a multiplexer output signal; and
   a port interface module receiving the output signal from the multiplexer, the port interface module receiving the first control signal from the first scheduler and the second control signal from the second scheduler,
   wherein an upgraded system software image is transferred to the second memory by the first CPU, the upgraded system software image is installed to the second CPU by the first CPU, and the second CPU is restarted to execute the upgraded system software image, and then the switching device stops control packet transmissions from the first scheduler, disables active fabric control signals from the first scheduler, enables active fabric control signals from the second scheduler, waits a period of time for transiting data to exit the switching device, enables control packet transmission from the second scheduler to make the second scheduler an active scheduler, and makes the second switch fabric an active switch fabric with no data loss, and
   wherein the upgraded system software image indicates a target hardware type and the upgraded system software image is validated before being installed to the second memory by validating that the target hardware type matches the hardware type of the switching device.

2. The device according to claim 1, wherein the first and second schedulers are time-based.

3. The device according to claim 1, wherein the period of time for transiting data to exit corresponds to a transit time for a maximum frame size plus a time to synchronize a data interface across the multiplexer.

4. The device according to claim 1, further including further port interface modules.

5. The device according to claim 1, further including a Fibre Channel flow control mechanism.

6. The device according to claim 1, wherein the device includes a Fibre Channel switch.

7. The device according to claim 1, wherein the first and second schedulers share information for switched virtual circuits.

8. A network switching device, comprising:
   a first processor generating a first control signal;
   a second processor coupled to the first processor, the second processor generating a second control signal;
   a port interface module receiving the first and second control signals;
   a multiplexer coupled to the port interface module to provide data to the port interface module and to receive a state control signal from the port interface module based upon the first and second control signals from the first and second processors;
   a first switching fabric coupled to the multiplexer; and
   a second switching fabric coupled to the multiplexer;

wherein the first processor is configured to transfer an upgraded system software image to the second processor and to install the upgraded system software image on the second processor;

wherein the switching device stops control packet transmissions, waits a period of time for transiting data to exit the switching device, and makes the second switch fabric an active switch fabric with no data loss, and wherein the upgraded system software image indicates a target hardware type and the upgraded system software image is validated before being installed to the second memory by validating that the target hardware type matches the hardware type of the switching device.

9. The device according to claim 8, wherein the period of time for transiting data to exit corresponds to a transit time for a maximum frame size plus a time to synchronize a data interface across the multiplexer.

10. The device according to claim 8, further including further port interface modules.

11. The device according to claim 8, wherein the device includes a Fibre Channel switch.

12. The device according to claim 8, wherein the first and second processors share information for switched virtual circuits.

13. A method for data switchover in a switching device, comprising:

receiving a system image file at the switching device;

validating the system image file, wherein the system image file indicates a target hardware type and validating the system image file includes validating that the target hardware type matches the hardware type of the switching device;

installing the system image file on a first CPU of the switching device;

transferring the system image file to a second CPU of the switching device by the first CPU;

installing the system image file on the second CPU of the switching device by the first CPU;

restarting the second CPU so that the second CPU executes the upgraded system image;

terminating data flow through the switching device by a first scheduler that is active;

waiting a period of time for transiting data to exit the switching device;

providing an indication to a second scheduler by the first scheduler that the first scheduler is no longer an active scheduler;

restarting the first scheduler;

initiating data flow through the switching device under control of the second scheduler, which is then active, without data loss.

14. The method according to claim 13, further including waiting for a period of time that corresponds to a maximum data transit time for the switching device.

15. The method according to 13, further including terminating data flow through the switching device upon a transition of one or both of a first control signal from the first scheduler and a second control signal from the second scheduler.

16. The method according to claim 13, further including providing lossless data switchover for a Fibre Channel crossbar switch architecture.

17. The method according to claim 13, further including ceasing data flow across a fully loaded 288 port switching device in less than about eight milliseconds.

18. The method according to claim 13, further including locating transition intelligence on a port interface module.

19. A method of providing a graceful code upgrade in a switching device, comprising:

receiving a system image file at the switching device;

validating the received image file, wherein the received image file indicates a target hardware type and validating the received image file includes validating that the target hardware type matches the hardware type of the switching device;

verifying that a standby switching module in the switching device is present by an active switching module in the switching device;

transferring the image file to the standby switching module by the active switching module;

installing the image file on the standby switching module by the active switching module;

restarting the standby switching module to run the installed image file;

installing the image file on the active switching module; and restarting the active switching module to transfer control to the standby switching module with no data loss.

20. The method according to claim 19, further including transferring control from the active switching module to the standby switching module based upon one or more of user request, hardware failure, software failure, and/or diagnostic mode.

* * * * *